C. L. BETZ.
STOPPER FOR GLASS POTS.
APPLICATION FILED APR. 23, 1910.

987,212.

Patented Mar. 21, 1911.
2 SHEETS—SHEET 1.

WITNESSES:
J. Herbert Bradley
Thos. J. Elbel

INVENTOR
Charles L. Betz
by Dennis B. Wolcott Atty

C. L. BETZ.
STOPPER FOR GLASS POTS.
APPLICATION FILED APR. 23, 1910.

987,212.

Patented Mar. 21, 1911.

2 SHEETS—SHEET 2.

WITNESSES:
O. Herbert Bradley
Thos. J. Elbel

INVENTOR
Charles L. Betz
by Dennis B. Wolcott Atty

UNITED STATES PATENT OFFICE.

CHARLES L. BETZ, OF ROCHESTER, PENNSYLVANIA, ASSIGNOR TO FRANK W. WOODRUFF, OF ROCHESTER, PENNSYLVANIA.

STOPPER FOR GLASS-POTS.

987,212.  Specification of Letters Patent.  Patented Mar. 21, 1911.

Application filed April 23, 1910. Serial No. 557,234.

*To all whom it may concern:*

Be it known that I, CHARLES L. BETZ, residing at Rochester, in the county of Beaver and State of Pennsylvania, a citizen of the United States, have invented or discovered certain new and useful Improvements in Stoppers for Glass-Pots, of which improvements the following is a specification.

In melting glass it is desirable that the mouth of the pot should be closed as tightly as possible to prevent the escape of the batch material which boils up during the melting and also to prevent the escape of heat therefrom. It has heretofore been the practice to first insert a tile in the mouth of the pot and outside of that an iron plate which will bear against the tile either directly or through a brick interposed between the tile and plate. These parts of the stopper are held in position by a suitable brace bearing against the plate and a suitable abutment. While such construction is fairly satisfactory when melting the first charge in a pot it is very far from satisfactory when melting a second and succeeding charges. This is due to the fact that in gathering the glass from the pot more or less will drop on the bottom of the hood and harden there so that the tile will not fit properly in the hood until such drippings be removed. This glass cannot be chipped away as portions of the pot will adhere to the pieces of glass and are liable to enter the pot thus introducing a material which will injuriously affect the glass. Hence it will be readily understood the tile cannot when the pot is first closed fit tightly and part of the batch when it begins to boil will escape past the tile and into contact with the plate.

The invention described herein has for its object a construction and combination of parts whereby a constant seating pressure may be applied directly to the tile so that it may be shifted to its seat as the glass softens, without disturbing the plate.

The invention is hereinafter more fully described and claimed.

Figure 1:
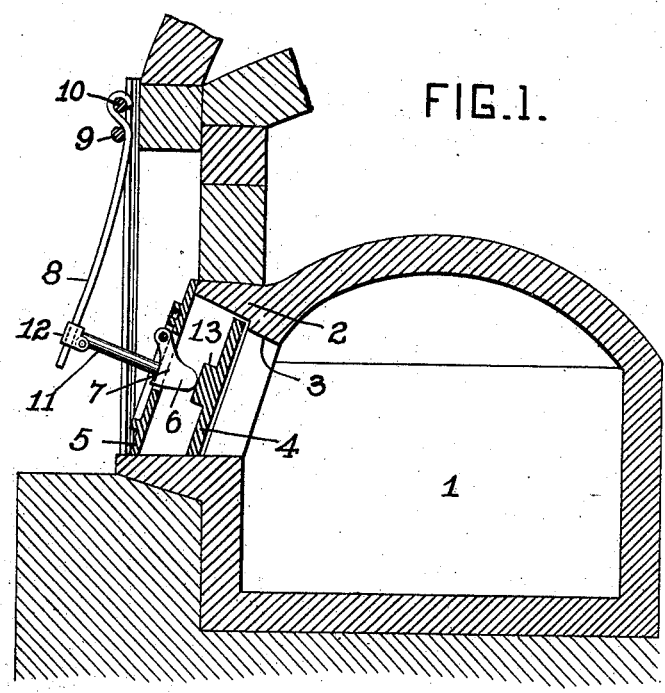
Figure 2:
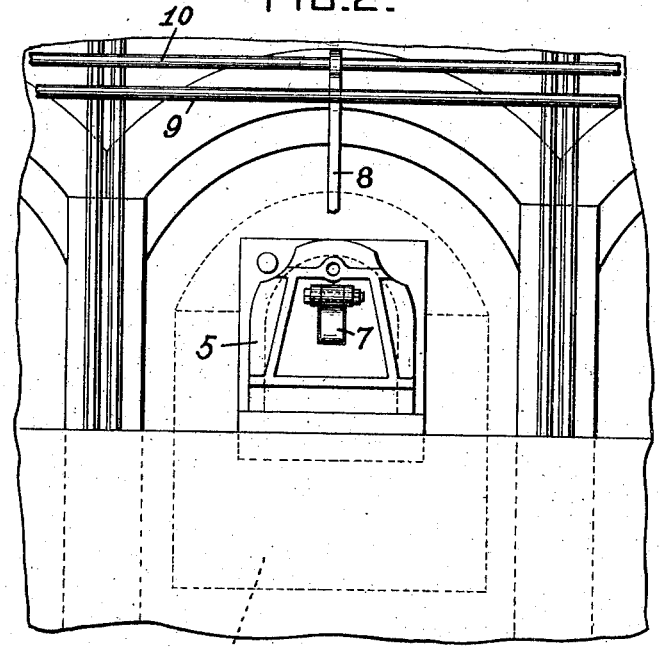
Figure 4:
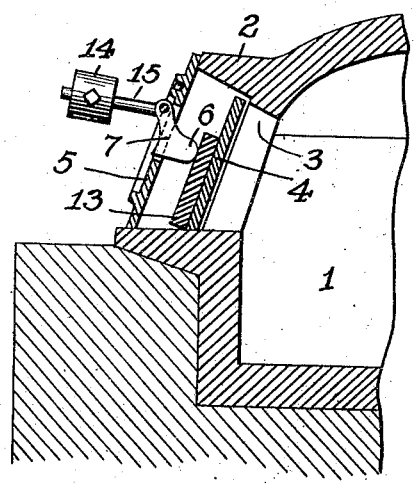
Figure 3:
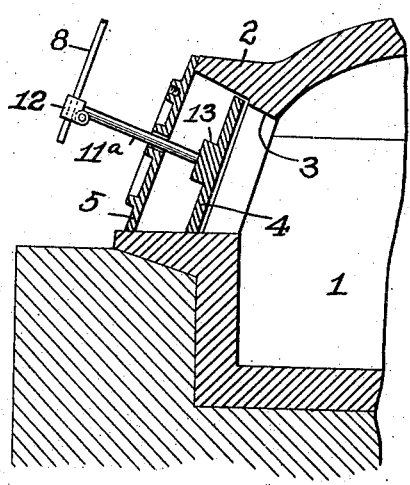
Figure 5:
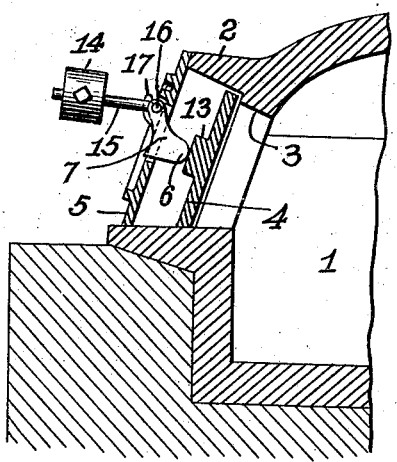
Figure 6:
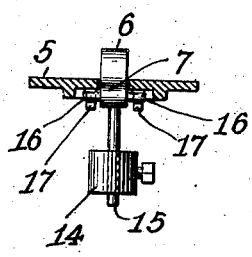

In the accompanying drawing forming a part of this specification Figure 1 is a sectional elevation of a pot and a portion of the furnace and showing my improved stopper in position, Fig. 2 is a front elevation of a portion of a glass furnace showing my improved stopper applied to a pot, Figs. 3, 4 and 5 are views similar to Fig. 1 illustrating modifications of my improvement and Fig. 6 is a sectional detail of the construction shown in Fig. 5.

The pot 1 is constructed in the usual manner having the hood portion 2. As will be seen by reference to Fig. 1 the hood is provided with an inwardly projecting rib 3, adjacent to its inner end, said rib forming a seat for the tile 4 forming the inner member of my improved stopper. In removing the glass from the pot by a blow pipe punty rod or by other means used in the art, portions will drop and harden on the bottom of the hood, in such quantities as to prevent the seating of the tile against the rib 3 when a new batch is to be melted. In such case the tile is placed as nearly as possible in position and the plate 5 is placed against the end of the hood and luted in position. Suitable means are employed whereby pressure may be applied to the tile to force it to its seat as the glass softens, without disturbing the seating plate 5. In the constructions shown in Figs. 1 and 2 an opening is formed in the plate for the passage of the toe 6 of a dog 7, which is pivotally mounted on the plate. This dog is so constructed and mounted on the plate that if sufficient pressure be applied to the dog, it will move the tile when free to move to its seat. Such pressure may be applied in several ways, as for example a resilient bar 8 may be attached to the furnace in any convenient manner as by slipping one end under the lower hog chain 9, while the bar is held in proper position by the chain 10. A brace 11 is interposed between the bar 8 and the dog 7 said brace being provided with an eye 12 for the reception of the bar along which it can be shifted to vary the pressure on the dog and the tile. It is preferred that the brace should be formed in two sections hinged together to facilitate the placing of the brace in position and removing it when necessary. It is preferred to interpose a non-conducting block, as a fire brick 13 between the tile and the dog to prevent excessive heating of the latter or to increase thickness of the tile as the point of bearing of the brace. In lieu of the dog 7, the brace may be made sufficiently long as shown at 11ª in Fig. 3 to project through an opening in the plate and bear directly in the tile.

In Fig. 4 is shown a construction in which a weight 14 is substituted for the resilient bar and its braces. The dog 7 is provided with an arm 15 so arranged that the weight 14 on said arm will cause the dog to move in through the plate and press against the tile. If desired the dog may be detachably mounted on the plate as shown in Figs. 5 and 6. In such case the dog may be provided with trunnions 16 which will rest in hooks 7 on the plate 5 when the dog is placed in position.

It will be observed that by my improvement the pot can be sealed by the plate 5 preventing any escape of heat, until the glass in the hood has softened and permitted the tile to be sealed by the pressure thereon. Such softening will usually occur before the batch has boiled up so that the tile will be in position to prevent the escape of material past it, and in that way will protect the plate. Another desirable feature is that the plate is not in contact with the tile and will not therefore become injuriously heated.

I claim herein as my invention.

1. A glass pot having in combination therewith a tile forming the inner stopper, a removable plate forming the outer closure, and means for shifting the tile independent of the plate.

2. A glass pot having in combination therewith a tile forming the inner stopper, a removable plate forming the outer closure, and means arranged outside of the plate and operative through the same for shifting the tile.

3. A glass pot having in combination therewith a tile forming the inner stopper, a removable plate forming the outer closure, a resilient arm and means interposed between the tile and arm and operative through the plate for shifting the tile.

4. A glass pot having in combination therewith a tile forming the inner stopper, a plate forming the outer closure, a dog pivotally mounted on the plate and means operative through the plate and adapted to exert a constant pressure on the dog whereby to shift the tile to its seat.

5. A glass pot having in combination therewith, a tile forming the inner stopper, a plate forming the outer closure a dog pivotally mounted on the plate, a spring arm suitably supported outside of the plate and a brace interposed between the arm and dog and adjustable along the arm.

In testimony whereof, I have hereunto set my hand.

CHARLES L. BETZ.

Witnesses:
ALICE A. TRILL,
THOS. J. ELBEL.

---

Copies of this patent may be obtained for five cents each, by addressing the "Commissioner of Patents, Washington, D. C."